United States Patent [19]
Tozawa

[11] B 3,927,419
[45] Dec. 16, 1975

[54] CARTRIDGE TAPE PLAYER

[75] Inventor: Minoru Tozawa, Kyoto, Japan

[73] Assignee: Mitsubishi Denki Kabushiki Kaisha, Tokyo, Japan

[22] Filed: Apr. 12, 1973

[21] Appl. No.: 350,589

[44] Published under the Trial Voluntary Protest Program on January 28, 1975 as document no. B 350,589.

[30] Foreign Application Priority Data

Apr. 20, 1972 Japan .............................. 47-39839

[52] U.S. Cl. ...................... 360/94; 360/61; 360/67; 360/78; 360/92

[51] Int. Cl.$^2$ ..................... G11B 23/18; G11B 21/08; G11B 23/04

[58] Field of Search ............ 179/100.2 CA, 100.2 Z, 179/100.2 MD; 274/4 G; 360/94, 92, 67, 61, 72, 78

[56] References Cited

UNITED STATES PATENTS

| | | | |
|---|---|---|---|
| 3,484,110 | 12/1969 | Takemi et al. | 179/100.2 CA |
| 3,532,347 | 10/1970 | Parsons | 179/100.2 CA |
| 3,548,114 | 12/1970 | Fish | 179/100.2 CA |
| 3,552,751 | 1/1971 | Kelso | 179/100.2 Z |
| 3,640,538 | 2/1972 | Tolar | 274/4 G |
| 3,656,761 | 4/1972 | Laschenski | 274/4 G |
| 3,702,192 | 11/1972 | Huber | 179/100.2 CA |
| 3,730,532 | 5/1973 | Miyamoto | 179/100.2 CA |
| 3,764,754 | 10/1973 | Mizumoto | 179/100.2 CA |

*Primary Examiner*—Alfred H. Eddleman
*Attorney, Agent, or Firm*—Oblon, Fisher, Spivak, McClelland & Maier

[57] ABSTRACT

A tape player for reproducing two types of cartridges wherein information is recorded on a plurality of tracks in different channels. The first type of cartridge has *m* programs wherein each program includes *n* lines of track among the plurality of tracks, which, for example, can comprise a two channel cartridge having four programs wherein each program comprises two tracks among the total of eight tracks. The second type of cartridge has *n* programs wherein each program includes *m* lines of track among the plurality of tracks, and for example, can comprise a four channel cartridge having two programs wherein each program comprises four tracks among the eight tracks. In the tape player of the invention, a magnetic head having *m* head elements and a head shift mechanism for providing *m* positions for said magnetic head is provided. When said first cartridge is utilized, reproduction of signals from *m*/2 head elements among *m* head elements is prevented and said magnetic head is kept at *m* positions. When the second cartridge is utilized, reproduction of signals from *m* head elements occurs and said magnetic head is prevented from being continuously kept at *m*/2 positions among the *m* head elements.

1 Claim, 7 Drawing Figures

CARTRIDGE TAPE PLAYER

BACKGROUND OF THE INVENTION

1. Field of the Invention

This invention relates to a cartridge type tape player, and more particularly, it relates to a tape player for reproducing two types or cartridges having different channels.

2. Description of the Prior Art:

Recently, magnetic tapes having eight tracks have been widely used. Cartridges for magnetic tapes having eight tracks are generally classified into two main types. The first type of cartridge is in the form of two channels, and has eight tracks with four programs in each of which recorded information in two tracks can be simultaneously played back. The second type of cartridge is in the form of four channels and has eight tracks with two programs in each of which recorded information in four tracks can be simultaneously played back.

In general, cartridge type tape players have been widely used for automobile stereophonic tape players. In the stereophonic field, tape players having two channel reproduction which reproduce said first type of cartridge have been mainly used. Various improvements of the tape players of the two-channel type cartridge have been proposed. Now, relatively inexpensive tape players having stable characteristics have been commercially available. Such a tape player having two-channel reproduction utilizes a head shift mechanism for shifting a magnetic head four steps corresponding to the four recorded programs and is thus formed to reproduce four programs from a magnetic tape having eight tracks.

It would obviously be preferable to employ a similar head shift mechanism to be able to reproduce information from four-channel cartridges by slightly changing the structure of the basic two-channel player, especially when developing a tape player for reproducing information from both types of cartridges.

A tape player for reproducing the recorded information of the two types of cartridges has been developed. However, many of such conventional tape players have complicated mechanisms for reproducing such information in the two types of cartridges, and are therefore not satisfactory. Accordingly, it would be highly desirable to obtain a tape player for reproducing information from the two types of cartridges which has a simple mechanism and is therefore a more reliable instrument.

SUMMARY OF THE INVENTION

Accordingly, it is a primary object of the present invention to provide a cartridge type tape player having a simple structure which can reproduce information from two types of cartridges having a different number of channels.

It is another object of this invention to provide a cartridge type tape player having a simple structure and a head shift mechanism similar to that of a two-channel tape player which can reproduce information from two types of cartridges having a different number of channels.

Briefly, according to this invention, a cartridge type tape player is provided for reproducing information from cartridges which have a magnetic tape having a plurality of tracks in parallel. The player is suitable for reproducing information from the first and second types of cartridges which have a different number of channels. The first type of cartridge has m programs each of which has n tracks among the plurality of tracks, while the second type of cartridge has n programs each of which has m tracks among the plurality of tracks. The tape player comprises a magnetic head having m head elements, which are placed adjacent to the magnetic tape for picking up a signal from a facing track, means for shifting the magnetic head across the tracks which provides m positions for reproducing m programs in the first type of cartridge and a detector for distinguishing the first type of cartridge from the second type of cartridge. When the first type of cartridge is detected, reproduction of signals from $m/2$ head elements among the m head elements is inactivated, and reproduction of signals from the remaining head elements is activated, and thus said magnetic head can be kept to m positions. When the second type of cartridge is detected, reproduction of signals from m head elements is activated and a magnetic head cannot be kept at $m/2$ positions among m positions and the magnetic head can be kept at the remaining positions.

BRIEF DESCRIPTION OF THE DRAWINGS

These and other objects and advantages of this invention will become more readily appreciated by reference to the following detailed description, when considered in connection with the accompanying drawings, wherein.

DESCRIPTION OF PREFERRED EMBODIMENTS

Figure 1:
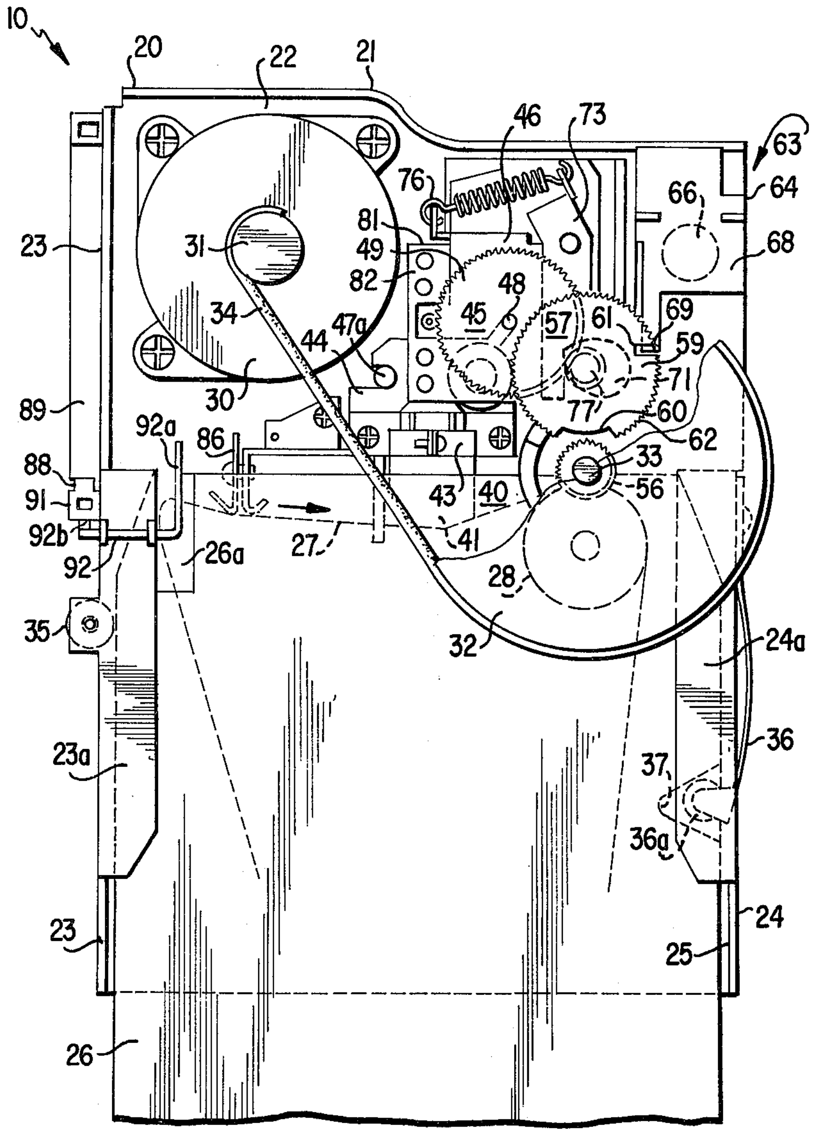
FIG. 1 is a partially cut-away plan view of one embodiment of a tape player in accordance with this invention.

Referring now to the drawings, wherein like reference numerals designate identical or corresponding parts through the several views, and more particularly to FIG. 1, thereof, one preferred embodiment of the cartridge type tape player of this invention is shown which comprises a mechanical assembly 10 which comprises a base structure 20, a head device 40 and detectors 81, 86, and 88. Base structure 20 comprises a base plate or a chassis 21 having a flat plate 22 and parallel side walls 23 and 24. At the front portion of chassis 21, side walls 23 and 24 have bent parts 23*a* and 24*a* respectively bent towards each other. The bent parts 23*a* and 24*a* are parallel to plate 22. A receiving part 25 is formed at the front portion of chassis 21. A cartridge 26 is shown inserted into the receiving part 25. Two types of cartridges, either the two channel type or the four channel type, can be inserted into receiving part 25. By way of example, the four channel cartridge is shown in FIG. 1.

The four channel cartridge 26 has a recess 26*a* formed in its left upper corner, whereas the two channel cartridge has no recess. Except for that difference, both types of cartridges have essentially the same structure. Accordingly, the description of the four channel cartridge 26 can be applied to the two channel cartridge. The cartridge 26 has an endless magnetic tape 27 having eight tracks and pinch rollers 28, the structure of which is well known.

Figure 6:
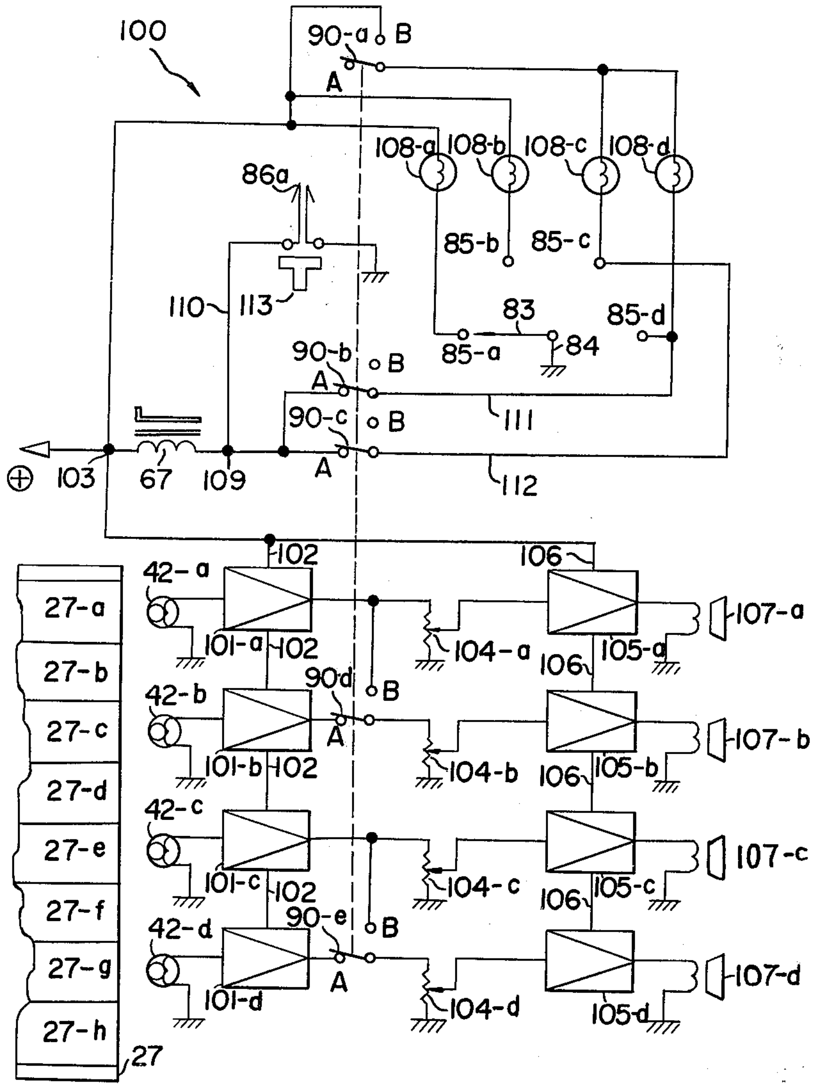
FIG. 6 is a diagram of the circuit assembly of the tape player of FIG. 1.
Figure 7:
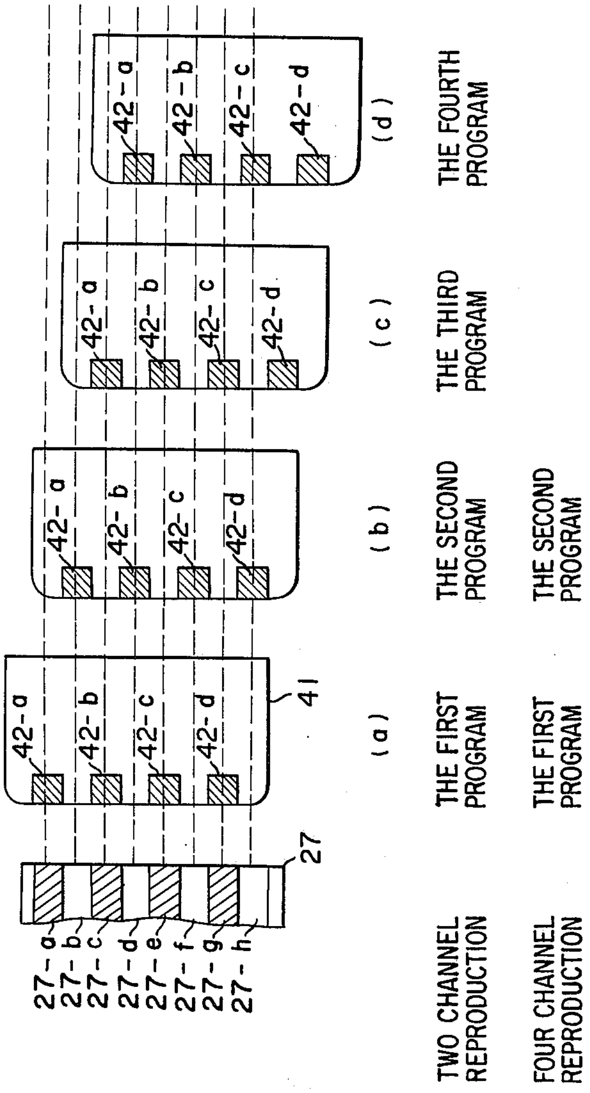
FIG. 7 is a schematic representation for illustrating the operation of the head shift mechanism of the tape player of FIG. 1.

The magnetic tape 27 is illustrated in FIGS. 6 and 7, wherein the eight tracks are designed by 27-*a*, 27-*b* . . . 27-*h*. In a two channel cartridge, the first program is formed by the first and the fifth tracks 27-*a* and 27-*e*, the second program is formed by the second and the sixth tracks 27-*b* and 27-*f*, the third program is formed by the third and the seventh tracks 27-*c* and 27-*g*, and the fourth program is formed by the fourth and the eighth tracks 27-*d* and 27-*h*. On the contrary, in a four channel cartridge, the first program is formed by the first, third, fifth and seventh tracks 27-*a*, 27-*c*, 27-*e* and 27-*g*, and the second program is formed by the second, fourth, sixth and eighth tracks 27-*b*. 27-*d*, 27-*f* and 27-*h*.

Referring again to FIG. 1, at the rear portion of the chassis a motor 30 is mounted on the plate 22. The motor is equipped with a motor pulley 31. A capstan 32 is arranged apart from the motor 30. The capstan 32 is fitted to a capstan shaft 33 which is rotatably held by a bearing (not shown) vertical to the plate 22. Motor pulley 31 and capstan pulley 32 are connected with a belt 34 so as to drive the capstan shaft 33 counterclockwise by the rotation of the motor pulley 31 in the counter-clockwise direction. Cartridge 26 is inserted by a guide of side rollers 35 and a roller 136a of a cartridge clamper 36. When cartridge 26 is inserted in its operative position, roller 36a of cartridge clamper 36 is fitted to a concave 37 of cartridge 26 so as to hold the cartridge 26 in a fixed position.

In the operative position, pinch roller 28 of cartridge 26 is pressed through the magnetic tape 27 to the capstan shaft 33. Accordingly, when capstan shaft 33 is driven to counter-clockwise direction, the tape 27 in cartridge 26 is moved in the direction of the arrow. The side roller 35 is passed through the side wall 23. The roller 36a of the cartridge clamper 36 is passed through the side wall 24 to project into the receiving part 25.

The head device 40 comprises a magnetic head 41 and a head shift mechanism 45 for shifting the head. The magnetic head 41 is arranged so as to contact magnetic tape 27 when the cartridge 26 is in its operative position. At the part of the magnetic head 41 in contact with the magnetic tape 27, a group of head elements 42 are provided, more clearly seen in FIGS. 2 and 3. The detail of the head elements 42 is clearly shown in FIG. 7, wherein four head elements 42-*a*, 42-*b*, 42-*c* and 42-*d* are shown positioned on head 41. These head elements are arranged with a predetermined spacing in accordance with the arrangement of tracks on the magnetic tape 27. The predetermined spacing is substantially equal to the width of two tracks.

Figure 2:
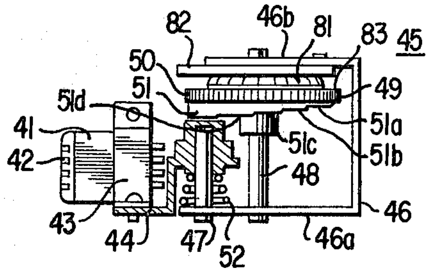

Referring now to FIG. 2, a head band 43 positions head 41 and is mounted to a head holder 44. The head holder 44 is shifted by the head shift mechanism 45 along the line vertical to the plate 22. The head shift mechanism 45 comprises a supporting table 46 having a U-shape which comprises a lower plate 46*a* and an upper plate 46*b*, substantially parallel to each other. The lower plate 46*a* is fitted above plate 22 in parallel relationship thereto. A guide post 47 is mounted to lower plate 46a and is projected into plate 22. Head holder 44 is slidably connected along guide post 47. A guide pin 47*a*, seen in FIG. 1, is fitted on the outer surface of head holder 44 and is fitted vertically to plate 22, so that head holder 44 is guided together with guide post 47.

On the supporting table 46, a gear post 48 is connected to pass through lower plate 46a and upper plate 46*b*, so as to be parallel to guide post 47. A cam gear 49 is rotatably mounted on gear post 48, and has a gear part 50 and a cam part 51 which is formed on the lower surface of gear part 50. The cam part 51 has four steps of cam surfaces 51-*a*, 51-*b*, 51-*c* and 51-*d* which are formed in four regions being four equal parts along the peripheral part of the lower surface of the gear part 50. A coil spring 52 on guide post 47 is fitted to lower plate 46*a* at the lower edge thereof, and to head holder 44 at the upper edge thereof, thereby pressing the head holder 44 to one cam surface of the cam part 51 at the upper part of the guide post 47.

In operation, during each quarter turn of the cam gear 49 around gear post 48, head holder 44 is progressively fitted to the next cam surface, so that the magnetic head 41 is progressively shifted along the guide post 47. When head holder 44 is fitted to the cam surface 51-*a*, the magnetic head 41 is in a first position, which is the highest position available in FIG. 2. When head holder 44 is fitted to the cam surfaces 51-*b*, 51-*c* and 51-*d*, magnetic head 41 is in the second, third and fourth positions, respectively. The fourth position provided by cam surface 51-*d* is the lowest position as shown in FIG. 2.

The relationship between the magnetic head 41 and the magnetic tape 27 in the first through the fourth positions is shown in FIG. 7. Positions (*a*), (*b*), (*c*) and (*d*) of FIG. 7 correspond to the first, second, third and fourth positions, respectively. At the first position (*a*) shown in FIG. 7, the head elements 42-*a*, 42-*b*, 42-*c* and 42-*d* of the magnetic head 41 face tracks 27-*a*, 27-*c*, 27-*e* and 27-*g*, respectively, of the magnetic tape 27. At the second position (*b*) shown in FIG. 7, the head elements 42-*a*, 42-*b*, 42-*c* and 42-*d* face tracks 27-*b*, 27-*d*, 27-*f* and 27-*h*, respectively. At the third position (*c*) shown in FIG. 7, three head elements 42-*a*, 42-*b* and 42-*c* among four head elements, face tracks 27-*c*, 27-*e* and 27-*g*, respectively, and head element 42-*d*does not face any track. At the fourth position (*d*) shown in FIG. 7, the three head elements 42-*a*, 42-*b*, and 42-*c* face tracks 27-*d*, 27-*f* and 27-*h*, respectively, while element 42-*d* again does not face any track.

Figure 3:
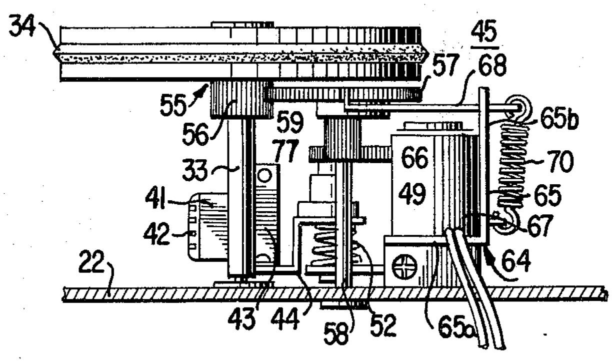
FIGS. 2 and 3 are respectively partial sectional side views of a head shift mechanism of the tape player of FIG. 1.
Figure 4:
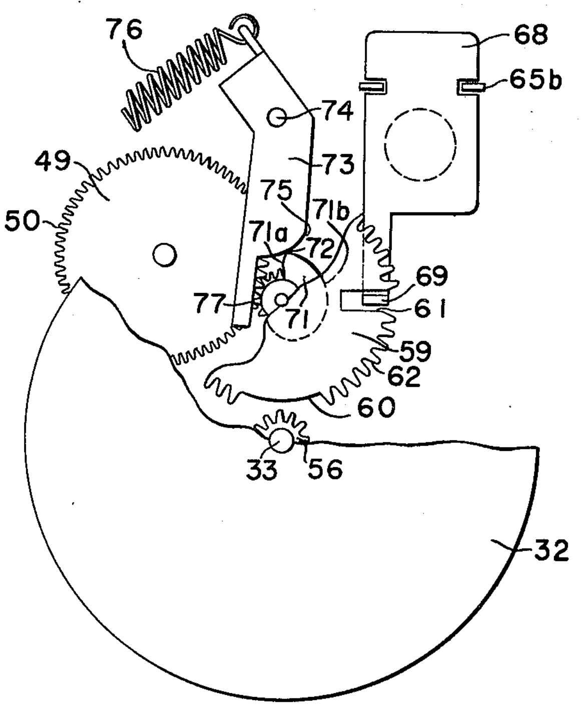
FIG. 4 is a partial top view of the head shift mechanism of the tape player of FIG. 1.

Referring now to FIGS. 3 and 4, the head shift mechanism 45 is seen to further comprise a driving mechanism 55 for driving the cam gear 49. The driving mechanism 55 comprises a capstan gear 56 mounted to capstan shaft 33 and rotated with the shaft, and further comprises an intermediate piece 57 which is fixed to the rotary shaft 58. The rotary shaft 58 is arranged vertically to plate 22 and is rotatably supported thereon. The intermediate piece 57 comprises a notched gear 59 at the upper part, an alert cam 71 at the middle part and a small gear 77 at the lower part as one unitary body. The notched gear 59 is substantially a flat gear having a notched part 60 located on the gear surface. A stopper groove 61 is formed beside notched part 60. The gear part 62 is formed all around the remaining part of the gear surface so as to interlock with the capstan gear 56. The notched part 60 has force enough to break the interlock between capstan gear 56 and gear part 62 when notched part 60 is facing capstan gear 56. However, stopper groove 61 is formed narrow enough to maintain the interlock between capstan gear 56 and gear part 62 when stopper groove 61 is facing capstan gear 56. When notched part 60 faces capstan gear 56, the intermediate piece 57 is not driven even when capstan gear 56 is turned. However, when the intermediate piece 57 is alerted so as to interlock gear part 62 to capstan gear 56, the intermediate piece 57 is turned by gear 56 one round so as to face notched part 60 to capstan gear 56 again.

In order to lock the intermediate piece 57 in the position where notched part 60 faces capstan gear 56, a lock mechanism 63 is seen in FIG. 1 is provided. The lock mechanism 63 is formed with an electromagnet 64 which is mounted on plate 22 and has an L-shaped base 65 which comprises a first arm 65a fitted to the plate 22 and a second arm 65b bent and projected vertically to plate 22, as seen in FIG. 2. A cylindrical iron core 66 is fixed to the first arm 65A and an electromagnetic coil 67 is wound on the fixed iron core 66. At the upper part of the second arm **65*b*, a piece 68 is movably supported. A connecting piece 69 is bent vertically and is provided at one free edge of movable piece 68, and a spring 70 is joined between the other free edge and the base 65. The connecting piece 69 is pressed to the lower surface of the notched gear 59 by the spring 70** in the normal condition.

The connecting piece 69 is fitted to the stopper groove 61 as seen in FIG. 4 when notched part 60 faces capstan gear 56, whereby intermediate piece 57 is locked in position. The movable piece 68 faces iron core 66 and when the electromagnetic coil 67 is actuated, movable piece 68 is moved by an electromotive force against the force of spring 70, whereby the connecting piece 69 disengages from the stopper groove 61 and the locked position of intermediate piece 57 is broken.

Further illustrated in FIG. 4 is an alert cam 71 which comprises a stepping surface **71*a* expanding in the radial direction of rotary shaft 58 and a spiral peripheral surface 71*b* connected to the outer end 72 of stepping surface 71*a*. An alert lever 73 cooperates with cam 71 and is supported by a pin 74 so as to pivot thereabout. A curved connecting surface 75 positioned adjacent cam 71 is formed at one free end of alert lever 73, while one end of spring 76 is fixed at the other free end. The other end of the spring 76 is fixed to a suitable fixed part (not shown). The lever 73 is thereby pivoted counter-clockwise, whereby the connecting surface 75 is pressed adjacent cam 71. When notched part 60 faces capstan gear 56, the connecting surface 75 is pressed to outer end 72 of the step surface 71a so that the intermediate piece 57 is actuated clockwise in FIGS. 1 and 4. But, when piece 59 is locked by piece 69, it cannot turn. However, when said lock is released by the actuation of the electromagnetic coil 67, the intermediate piece 57 is immediately turned clockwise by the alert cam 71 and the alert lever 73. The rotation causes the interlocking of gear part 62 to capstan gear 56. The small gear 77 is a conventional flat gear and the gear part 50 of the cam gear 49 is interlocked with small gear 77 in its normal condition. The teeth ratio of the small gear 77 to the gear part 50 of the cam gear 49 is approximately 1 : 4 so that when small gear 77 is turned through one revolution, cam gear 49 rotates through a quarter revolution. The cam gear 49 is, in turn, rotated through a one-fourth revolution when intermediate piece 57 is rotated one revolution so that the magnetic head 41** is progressively placed to the position corresponding to the next cam surface.

Shown in FIG. 1 are three detectors 81, 86 and 88. The first detector 81 detects the position of the magnetic head 41 among the first, second, third and fourth positions and is assembled in the head shift mechanism 45. The first detector 81 is clearly shown in FIG. 2 and comprises a base plate 82 mounted to upper plate **l46*b* of holder 46 of head shift mechanism 45, and a conductive contacting element 83 fixed on the upper surface of gear part 50 of cam gear 49. The base plate 82 is made of an insulating material and is fitted so as to face cam gear 49. The gear post 48 is passed through a hole 82*a* of base plate 82.**

Figure 5:
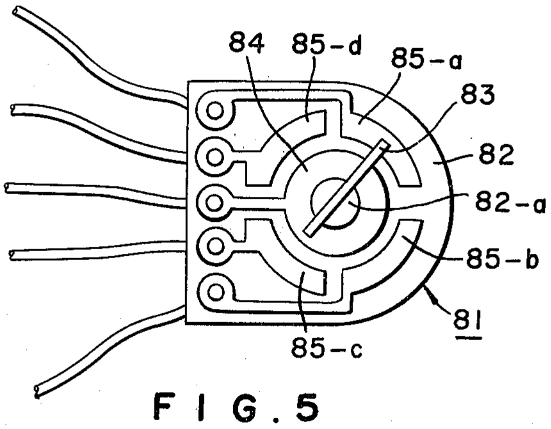
FIG. 5 is a partial view of a detector of the tape player of FIG. 1.

FIG. 5 is a view of the base plate 82 observed from the side of the cam gear 49. A first conductive annular piece 84 is mounted to base plate 82 surrounding the hole **82*a*. The second conductive piece is divided into four segments 85-*a*, 85-*b*, 85-*c* and 85-*d* which are mounted on the outer periphery of the first conductive segment 84. In FIG. 5, the contacting element 83 is schematically shown, and rotates with cam gear 49. Contact element 83 makes contact to the first conductive segment 84 in a normal operative condition, and progressively contacts one of the second conductive segments depending upon its rotation. The size of segment 85-*a* is predetermined so as to contact the contacting element 83 when the magnetic head 41 is in its first position. In a similar manner, the sizes of segments 85-*b*, 85-*c* and 85-*d* are predetermined so as to contact the contacting element, respectively, when the magnetic head 41** is in its second, third and fourth positions, respectively.

The second detector 86 shown in FIG. 1 is a conventional detector for detecting the fact that the end of the information on each track of the magnetic tape 27 in the cartridge 26 faces magnetic head 41. Detector 86 is placed adjacent magnetic head 41 and has a switch for forming a closed circuit when the end of the information on each track faces magnetic head 41. The switch is designated by the reference **86*a* in FIG. 6.**

The third detector 88 is utilized for detecting whether a two channel or a four channel cartridge is received by the tape player. The detector 88 is of a well known type and is actuated depending upon the presence of slit **26*a* on the cartridge, as explained hereinafter. Detector 88 is seen in FIG. 1 to comprise a switch box 89 mounted on the side wall 23 of chassis 21. Switch box 89 receives five switches, which are designated by the references 90-*a*, 90-*b*, 90-*c*, 90-*d* and 90*e* in FIG. 6, and which are mutually operated under the interlocking. An operation rod 91 is set in switch box 89 and is maintained in its normal position out from switch box 89 by a spring kept in switch box 89. An operation arm 92 is rotatably mounted to the bent part 23*a* of side wall 23. At an end of operation arm 92, a connecting arm 92*a* is projected to the position of the slit 26*a*, and at the other end thereof, a connecting arm 92*b* bent vertically and projected to the operation rod 91.**

In operation, when a four channel cartridge having a slit **26*a* is received, the free end of the operation arm 92*a* substantially turned towards the direction of the paper of FIG. 1, so that the operation rod 91 is substantially projected from the switch box 89. When a two channel cartridge having no slit is received, the turning of the operation arm 92*a* is prevented, so that the operation rod 91 is retained in the switch box 89 by the operation arm 92***b*. When a four channel cartridge is applied the movement of the operation rod 91 moves all of the switches 90-*a*, 90-*b*, 90-*c*, 90-*d* and 90*e* to position A, as shown in FIG. 6. On the other hand, when a two channel cartridge is applied, all of the said switches switch to position B.

The remainder of the circuit assembly 100 shown in FIG. 6 will now be explained. The head elements 42-*a*, 42-*b*, 42-*c* and 42-*d* are respectively connected to the input terminals of the preamplifiers 101-*a*, 101-*b*, 101-*c*, and 101-*d* which are all biased by a voltage applied through a line 102 from a contact 103, which is connected to a positive pole of a DC power source (not shown). Volume controls 104-*a*, 104-*b*, 104-*c* and 104-*d* are respectively connected to an output terminal of each of the preamplifiers. The output terminals of the volume controls are respectively connected to an input terminal of each of the power amplifiers 105-*a*, 105-*b*, 105-*c* and 105-*d*, which are connected through a line 106 to contact 103, so that a proper bias voltage is applied. Speakers 107-*a*, 107-*b*, 107-*c* and 107-*d* are respectively connected to an output terminal of each of the power amplifiers 105-*a*, 105-*b*, 105-*c* and 105-*d*. In an automobile, for example, the speaker 107-*a* is set at a front left side, speaker 107-*b* is set at a rear left side, speaker 107-*c* is set at a front right side, and speaker 107-*d* is set at a rear right side.

The first conductive segment 84 of the first detector 81 is grounded and the second conductive segments 85-*a*, 85-*b*, 85-*c* and 85-*d* are respectively connected to one end of the display lamps 108-*a*, 108-*b*, 108-*c* and 108-*d*. The other end of each of the display lamps 108-*a* and 108-*b* are directly connected to the contact 103. On the other hand, the other end of each of the display lamps 108-*c* and 108-*d* are connected through the B contact of switch 90-*a* to contact 103. The A side contact of the switch 90-*a* is not used. One end of the electromagnetic coil 67 of electromagnet 64 is connected to the contact 103 and the other end thereof is connected to the contact 109. Three circuits 110, 111 and 112 connect contact 109 to ground. The first circuit 110 is a circuit comprising the switch 86*a* of the second detector 86. A hand operated switch 113 is set in parallel to switch 86*a*. The second circuit 111 is a circuit for connecting through the A contact of switch 90-*b* to segment 85-*c* of the first detector 81. The third circuit 112 is a circuit for connecting through the A contact of the switch 90-*c* to the segment 85-*d* of the first detector 81. The B contacts of switches 90-*b* and 90-*c* are not used. The A contact of switch 90-*d* is connected to the output terminal of preamplifier 101-*b* and the B contact of switch 90-*d* is connected to the output terminal of preamplifier 101-*a*. The volume control 104-*b* is connected through the A contact of switch 90-*d* to the output terminal of the preamplifier 101-*b*. The A contact of switch 90-*e* is connected to the output terminal of preamplifier 101-*d* and the B contact of switch 90-*e* is connected to the output terminal of preamplifier 101-*c*. The volume control 104*d* is connected through the A contact of switch 90-*e* to the output terminal of preamplifier 101-*d*.

The reproduction or play operation of a two channel cartridge and a four channel cartridge will now be explained. When a two channel cartridge is utilized, the switches 90-*a*, 90-*b*, 90-*c*, 90-*d* and 90-*e* are in position B in FIG. 6. If the magnetic head 41 is in its first position (*a*) of FIG. 7, the head elements 41-*a*, 42-*b*, 42-*c* and 42-*d* are respectively facing tracks 27-*a*, 27-*c*, 27-*e* and 27-*g*, so that the information in each of the respective tracks is picked up. The signals picked up by head elements 42-*a*, 42-*b*, 42-*c* and 42-*d* are respectively amplified by the preamplifiers 101-*a*, 101-*b*, 101-*c* and 101-*d*. However, the switches 90-*d* and 90-*e* are positioned at B, and accordingly, the outputs of preamplifiers 101-*b* and 101-*d* are not used. As a result, the signals picked up by head elements 42-*b* and 43-*d* are not used in this case. The output of preamplifier 101-*a* is supplied through volume control 104-*a* to power amplifier 105-*a*, and also is supplied through the B contact of switch 90-*d* to volume control 204-*b* to power amplifier 105-*b*. The output of preamplifier 101-*c* is supplied through volume control 104-*c* to power amplifier 105-*c*, and also is supplied through the B contact of switch 90-*e* to the volume control 104-*d* to power amplifier 105-*d*. As a result, the information in track 27-*a* is reproduced by speakers 107-*a* and 107-*b*, and the information in track 27-*e* is reproduced by speakers 107-*c* and 107-*d*, so that the first program of the two channel cartridge will thereby be reproduced. In this case, the contacting element 83 of the first detector 81 is connected to conductive segments 84 and 85-*a*, and, accordingly, the display lamp 108-*a* is actuated so as to indicate the reproduction of the first program.

In order to reproduce the second program, the switch 86-*a* is closed, and the first circuit 110 is thereby completed, so that the electromagnetic coil 67 of electromagnet 64 is actuated. This causes, in turn, the interlock of the fitting piece 69 to the stopper groove 61 to be released so that the intermediate piece 57 is released. As a result, the intermediate piece 57 is driven by capstan gear 56 whereby the intermediate piece 57 is turned to one rotation whereby magnetic head 41 comes to rest in its second position (*b*) of FIG. 7. It is understood that the switch 86*a* is designed to close for only a short time. When the intermediate piece 57 has rotated one time, the electromagnet 64 will be inactivated. The connecting piece 69 is fitted to the stopper groove 61 when the stopper groove 61 is placed above piece 69 by spring 70, whereby the intermediate piece 57 will be locked. When the magnetic head 41 is in its second position (*b*), shown in FIG. 7, the information in track 27-*b* which is picked up by the head element 42-*a* will be reproduced by speakers 107-*a* and 107-*b*. The information in track 27-*f* which is picked up by head element 42-*c* is reproduced by speakers 107-*c* and 107-*d*, so that the second program of the two channel cartridge will thereby be reproduced in a fashion analogous to the first program. In this case, the contacting element 83 is connected to segments 84 and 85-*b* so that display lamp 108-*b* is lighted to indicate the reproduction of the second program.

In the same manner, when the reproduction of the second program is finished, the switch 86-*a* is ON so that the third position (*c*) shown in FIG. 7 is given to the magnetic head 41, and the information of tracks 27-*c* and 27-*g* is reproduced as the number three program. When the reproduction of the third program is finished, the switch 86*a* is ON again, and the fourth position (*d*) shown in FIG. 7 of the magnetic head 41 is reached, so that the information in tracks 27-*d* and 27-*h* are respectively reproduced as the fourth program. When the reproduction of the fourth program is finished, the reproduction of the first program begins again. When the third program is reproduced, the contacting element 83 is connected between segments 84 and 85-*c* whereby the display lamp 108-*c* is lighted through the switch 90-*a* positioned at B. When the fourth program is reproduced, the contacting element 83 is connected between the segments 84 and 84-*d* whereby the display lamp 108-*d* is lighted. When the hand-operated switch 113 is closed, the same result is achieved as would be by closing switch 86*a* so that the reproduced program can be manually switched, as desired.

When a four channel cartridge is utilized, all of the switches 90-*a*, 90-*b*, 90-*c*, 90-*d* and 90-*e* of the circuit of FIG. 6 are positioned to A. Since switch 90-*d* and 90-*e* are positioned at A, the signal picked up by head elements 42-*a*, 42-*b*, 42-*c* and 42-*d* are transmitted through preamplifiers 101-*a*, 101-*b*, 101-*c* and 101-*d* and the volume controls 104-*a*, 104-*b*, 104-*c* and 104-*d* to power amplifiers 105-*a*, 105-*b*, 105-*c* and 105-*d*, and are respectively reproduced by speakers 107-*a*, 107-*b*, 107-*c* and 107-*d*. In such a case, if the magnetic head 41 is initially set in its first position (*a*) shown in FIG. 7, head elements 42-*a*, 42-*b*, 42-*c* and 42-*d* will pick up the information on each of the tracks 27-*a*, 27-*c*, 27-*e* and 27-*g*, respectively, so that the first program on the four channel tape will be reproduced, lighting the display lamp 108-*a*. When the reproduction of the first program is finished and the switch 86a is ON, the second position (*b*) shown in FIG. 7 is given to the magnetic head 41. Simultaneously, the contacting element 83 connected to the segments 84 and 85-*a* switches to connect the segments 84 and 85-*b*. In this state, head elements 42-*a*, 42-*b*, 42-*c* and 42-*d* will pick up the information of tracks 27-*b*, 27-*d*, 27-*f* and 27-*h* so that the second program will be reproduced.

When a four channel cartridge is utilized, the third and fourth positions (*c*) and (*d*) shown in FIG. 7 are only temporarily reached by the magnetic head. The magnetic head 41 is not continuously kept in the third or the fourth positions, due to the position of switches 90-*b* and 90-*c* at A during a four channel operation. to explain further, when the second program is finished and switch 86*a* is ON for a short time, intermediate piece 57 is substantially rotated through one revolution so that the third position (*c*) shown in FIG. 7 is reached by the magnetic head 41. Simultaneously, the contacting element 83 is connected between the segments 84 and 85-*c*, so that the second circuit 112 is completed to ground contact 109. Accordingly, even though the switch 86*a* is opened, when the third position (*c*) is reached, the second circuit 112 yields the same result as if switch 86*a* were actuated, so that the intermediate piece 57 is rotated again one revolution by capstan gear 56. In accordance with the rotation of intermediate piece 57, the fourth position (*d*) shown in FIG. 7 is temporarily reached. However, the contacting element 83 now connects segments 84 and 85-*d* so as to complete the third circuit 111 to ground contact 109. Accordingly, the intermediate piece 57 is rotated an additional revolution so that the first position (*a*) is reached by the magnetic head 41. Since switch 90-*a* is positioned at A, the display lamps 85-*c* and 85-*d* do not light. The hand-operated switch 113 can also be used in this case. However, the third and fourth positions are not continuously reached by the magnetic head 41 and only the first and the second programs are reproduced at the first and the second positions.

In the foregoing preferred embodiments, the 8 track, 2 channel, 4 program cartridge is used as a first type of cartridge, and the 8 track, 4 channel, 2 program cartridge is used as a second type of cartridge. However, in general, it is possible to use an *n*-channel, m-program cartridge as the first type of cartridge and an *m*-channel, n-program cartridge as the second type of cartridge.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A cartridge tape player for reproducing a first cartridge having four programs with two tracks per program and for reproducing a second cartridge having two programs with four tracks per program comprising:

a first magnetic head, a first pre-amplifier connected to said first magnetic head, first volume control means connected to said first pre-amplifier, a first power amplifier connected to said first volume control means, a first speaker connected to said first power amplifier, a second magnetic head, a second pre-amplifier connected to said second magnetic head, second volume control means connected to said second pre-amplifier, a second power amplifier connected to said second volume control means, a second speaker connected to said second power amplifier, a third magnetic head, a third pre-amplifier connected to said third magnetic head, third volume control means connected to said third pre-amplifier, a third power amplifier connected to said third volume control means, a third speaker connected to said third power amplifier, a fourth magnetic head, a fourth pre-amplifier connected to said fourth magnetic head, fourth volume control means connected to said fourth pre-amplifier, a fourth power amplifier connected to said fourth volume control means, a fourth speaker connected to said fourth power amplifier, a first display lamp to indicate when a first program of the first or second cartridge is being reproduced, a second display lamp to indicate when a second program of the first or second cartridge is being reproduced, a third display lamp to indicate when a third program of the first cartridge is being reproduced.

a fourth display lamp to indicate when a fourth program of the first cartridge is being reproduced, first selection means for selecting reproduction of the first program of the first or second cartridge, second selection means for selecting reproduction of the second program of the first or second cartridge, third selection means for selecting reproduction of the third program of the first cartridge, fourth selection means for selecting reproduction of the fourth program of the first cartridge, said first, second, third and fourtth magnetic heads being arranged in a four head assembly wherein each head is spaced from adjacent heads by substantially a two track distance, means responsive to the detection of the end of the each program of the first or second cartridge to displace said magnetic head assembly in a direction perpendicular to the track length for reproduction of successive programs, means to detect the presence of and identify the first cartridge, means to detect the presence of and identify the second cartridge, first, second, third, fourth and fifth switches ganged together so that said first, second, third, fourth and fifth switches operate simultaneously, means to simultaneously position said first, second, third, fourth and fifth switches in a first position in response to detection of the identification of the second cartridge, means to simultaneously position said first, second, third, fourth and fifth switches in a second position in response to the detection of and identification of the first cartridge, said first switch when in its first position functioning to prohibit illumination of said third and fourth display lamps, said first switch when in its second position functioning to permit selective lighting of said third and fourth display lamps, said second switch when in its first position functioning to prohibit selection for reproduction of the third program of the second cartridge, said second switch when in its second position functioning to permit selection for reproduction of the third program of the first cartridge, said third switch when in its first position functioning to prohibit selection for reproduction of the fourth program of the second cartridge, said third switch when in its second position functioning to permit selection for reproduction of the fourth program of the first cartridge, said fourth switch when in its first position functioning to permit the second speaker to reproduce the signal picked up by the second magnetic head, said fourth switch when in its second position functioning to disconnect the second magnetic head from said second speaker and functioning to connect the first magnetic head to said second speaker, said fifth switch when in its first position functioning to permit the fourth speaker to reproduce the signal picked up by said fourth magnetic head, said fifth switch when in its second position functioning to disconnect the fourth magnetic head from said fourth speaker and functioning to connect the third magnetic head to said fourth speaker whereby, the first program of the first cartridge is reproduced from the first and fifth tracks by the first and third heads which are coupled to the first and second speakers, and third and fourth speakers respectively while the first display lamp is illuminated, the second program of the first cartridge is reproduced from the second and sixth tracks by the first and third heads which are coupled to the first and second speakers, and third and fourth speakers respectively while the second display lamp is illuminated, the third program of the first cartridge is reproduced from the third and seventh tracks by the first and third heads which are coupled to the first and second speakers, and third and fourth speakers respectively while the third lamp is illuminated, the fourth program of the first cartridge is reproduced from the fourth and eighth tracks by the first and third heads which are coupled to the first and second speakers, and third and fourth speakers respectively while the fourth display lamp is illuminated, the first program of the second cartridge is reproduced from the first, third, fifth and seventh tracks by the first, second, third and fourth heads respectively which are coupled to the first, second, third and fourth speakers respectively while the first display lamp is illuminated, and the second program of the second cartridge is reproduced from the second, fourth, sixth and eighth tracks by the first, second, third, and fourth heads respectively which are coupled to the first, second, third and fourth speakers respectively while the second display lamp is illuminated.

* * * * *